United States Patent

Kanome et al.

[11] Patent Number: 5,266,136
[45] Date of Patent: Nov. 30, 1993

[54] PROCESS FOR PRODUCING A ROLL STAMPER FOR MOLDING A SUBSTRATE SHEET FOR INFORMATION RECORDING MEDIUMS

[75] Inventors: Osamu Kanome, Kawasaki; Tsuyoshi Santoh, Yokohama; Hiroyuki Sugata, Yamato; Masataka Yashima, Yokohama; Tetsuya Sato, Kawasaki; Hitoshi Yoshino, Tokyo; Hirofumi Kamitakahara, Yokohama; Hisanori Hayashi, Kawasaki, all of Japan

[73] Assignee: Canon Kabushiki Kaisha, Tokyo, Japan

[21] Appl. No.: 11,825

[22] Filed: Feb. 1, 1993

Related U.S. Application Data

[63] Continuation of Ser. No. 629,574, Dec. 18, 1990, abandoned.

[30] Foreign Application Priority Data

Dec. 19, 1989 [JP] Japan ................. 1-330383
Mar. 6, 1990 [JP] Japan ................. 2-52807
Mar. 6, 1990 [JP] Japan ................. 2-52808

[51] Int. Cl.$^5$ ............................................. B05D 3/06
[52] U.S. Cl. ............................ 156/150; 264/1.3; 264/1.4; 264/106; 264/2.5; 427/456; 427/250; 205/70

[58] Field of Search ................ 264/1.3, 1.4, 2.5, 106, 264/107, 284, 81; 427/250, 456; 205/70; 156/150

[56] References Cited

U.S. PATENT DOCUMENTS 3,768,946 10/1973 Matuschke ................. 264/106
4,141,731 2/1979 Jarsen ........................ 264/106
4,968,370 11/1990 Watkins ..................... 264/284

FOREIGN PATENT DOCUMENTS 56-86721 7/1981 Japan.
114031 6/1984 Japan ........................ 264/1.3

*Primary Examiner*—Jeffery Thurlow
*Assistant Examiner*—Mathieu Vargot
*Attorney, Agent, or Firm*—Fitzpatrick, Cella, Harper & Scinto

[57] ABSTRACT

A process for producing a roll stamper which molds a substrate sheet for information recording mediums by continuously transferring preformat patterns on a resin sheet. The roll stamper has the feature that the preformat pattern on the roll stamper has a value b/a of greater than 1, where the length of the preformat pattern in the direction parallel to the direction in which the resin sheet is transported is defined as a and the length in the direction perpendicular thereto as b.

6 Claims, 4 Drawing Sheets

5,266,136

PROCESS FOR PRODUCING A ROLL STAMPER FOR MOLDING A SUBSTRATE SHEET FOR INFORMATION RECORDING MEDIUMS

This application is a continuation of application Ser. No. 07/629,574, filed Dec. 18, 1990, now abandoned.

BACKGROUND OF THE INVENTION

1. Field of the Invention

The present invention relates to a roll stamper for continuously producing substrates for information recording mediums by forming preformats on a resin sheet. It also relates to a process for producing the roll stamper.

2. Related Background Art

Preformats such as track grooves or address pits are formed on substrates for information recording mediums such as optical disks. As a method of continuously mass-producing such substrates, Japanese Patent Application Laid-open No. 56-86721 discloses a method in which a thermoplastic synthetic resin sheet is heated and softened using an infrared lamp and thereafter signals in the form of grooves or pits are transferred using a molding roll.

The roll stamper used in such a method is prepared by sticking a flat-plate thin stamper on a mirror-finished roll substrate with an adhesive or the like or mechanically fastening the stamper on the substrate by means of a jig or the like, or by directly forming a preformat pattern on the body of a roll substrate.

As the preformat pattern formed on the roll stamper, a preformat pattern similar to those used in conventional methods is used in which the substrate is formed sheet by sheet as in the injection process, the compression process and the photopolymerization process (hereinafter "2P process"), which pattern is substantially circular, for example, in the case of a disk.

With regard to the accuracy of the preformat pattern provided on the stamper used in the conventional injection process, compression process or 2P process, tracking errors tend to occur unless a deviation from a circle is controlled to be not more than 100 μm in the case of the disk.

When preformats are, however, continuously formed on a resin sheet, a relatively large pressure is applied to the roll stamper or a shrinkage may occur with the cooling of resin, in the direction perpendicular to the direction in which the resin sheet is transported. Hence, in the case where the roll stamper on which the above substantially circular pattern has been formed is used, there is the problem that the preformat transferred onto the resin sheet causes a lowering of transfer accuracy, specifically, a lowering of the circularity or roundness. In particular, in the case of recording mediums like optical disks on which fine patterns are formed and information with a high density is recorded and reproduced, the lowering of the roundness may cause errors such as tracking-off.

SUMMARY OF THE INVENTION

The present invention was made taking into account the above problems. An object of the present invention is to provide a roll stamper used for molding a substrate sheet for information recording mediums, that can accurately form preformats in a continuous manner on a resin sheet, and a process for producing such a stamper.

Another object of the present invention is to provide a process for producing a substrate sheet for information recording mediums, that can obtain an information recording medium substrate sheet on which preformats have been accurately formed.

The roll stamper of the present invention for molding a substrate sheet for information recording mediums is a roll stamper which molds a substrate sheet for information recording mediums by continuously transferring preformat patterns on a resin sheet, wherein the preformat pattern on the roll stamper has a value of b/a of greater than 1 when the length of the preformat pattern in the direction parallel to the direction in which the resin sheet is transported is defined as a and the length in the direction perpendicular thereto as b.

The process of the present invention for producing a substrate sheet for information recording mediums comprises continuously transferring preformat patterns on a resin sheet by the use of a roll stamper, wherein the preformat pattern on the roll stamper has a value of b/a of greater than 1 when the length of the preformat pattern in the direction parallel to the direction in which the resin sheet is transported is defined as a and the length in the direction perpendicular thereto as b.

The process for producing the roll stamper of the present invention is a process for producing a roll stamper which molds a substrate sheet for information recording mediums by continuously transferring preformat pattern on a resin sheet, comprising the steps of;

a) while an original plate having thereon a photoresist layer is rotated at a given number of revolutions per minute, vibrating a cutting head for cutting a pattern on the photoresist layer, corresponding to the preformat pattern, or vibrating the original plate, at a frequency twice the given number of revolutions per minute the original plate and in the diameter direction of the original plate, thereby cutting said pattern on the photoresist layer, followed by development to form a resist pattern in which each track is elliptical and which has an elliptical shape having a value of b/a of greater than 1 when the length of the minor axis is defined as a and the length of the major axis as b, at the outermost track;

b) carrying out electroforming on the resist pattern to form a stamper having the preformat pattern; and c) fixing the stamper to a roll substrate in such a manner that the minor axis direction of said pattern is in accordance with the direction in which the resin sheet is transported.

In this way the size of a preformat pattern is deviated from its standard shape in a specific range. It is thus possible to compensate the deformation of a preformat transferred onto a resin sheet, caused by the elongation of a stamper that may occur when a pattern is transferred onto a resin sheet and by the shrinkage due to cooling on the resin sheet, so that a very accurate preformat pattern can be formed on the resin sheet.

DESCRIPTION OF THE PREFERRED EMBODIMENTS

The roll stamper of the present invention for molding a substrate sheet for information recording mediums will be described below in detail with reference to the drawings.

Figure 1:
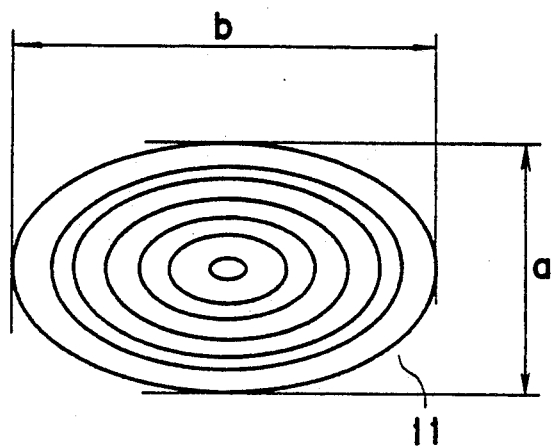
FIG. 1 diagramatically illustrates an embodiment of the pattern form of the roll stamper according to the present invention.

FIG. 1 diagramatically illustrates a preformat pattern 11 formed on the stamper of the present invention. In FIG. 1, the letter symbol a represents the diameter in the direction parallel to the direction in which a resin sheet is transported, corresponding to the diameter of the outermost track of a pattern formed on the stamper. The letter symbol b represents the diameter of this pattern in the direction perpendicular to the direction in which the resin sheet is transported. The roll stamper of the present invention is characterized in that the value of b/a (the value of b divided by a) is greater than 1.

In this way a difference is given in the size ratio between the preformat pattern formed on the roll stamper and the standard shape of the preformat to be transferred to the resin sheet. It is thus possible to compensate for the deformation of a preformat pattern transferred onto a resin sheet, caused by the elongation of a stamper that may occur when the resin sheet and the stamper are brought into contact and by the shrinkage of the resin sheet, so that a preformat pattern can be very accurately formed on the resin sheet.

In the roll stamper of the present invention, the relation between a and b should satisfy the following expression (1), and, particularly when the preformat is formed on a molten resin sheet, should preferably satisfy the following expression (2).

$$0.05 \leq (b-a)/a \times 100 \leq 2 \quad (1)$$

$$0.1 \leq (b-a)/a \times 100 \leq 1 \quad (2)$$

Use of the stamper that satisfies the relation represented by the above expression makes it possible to particularly minimize the deformation of a preformat pattern transferred onto the resin sheet, caused by the elongation of a stamper that may occur when the preformat is transferred onto the resin sheet and by the shrinkage of the resin sheet that may occur after the transfer.

There are no particular limitations on the shape and size of the preformat pattern formed on the roll stamper of the present invention and patterns with any shape and size can be used so long as they correspond to preformats formed on substrates of information recording mediums.

Grooves or pits formed on a substrate of an optical recording medium such as an optical disk or optical card on which information is recorded or reproduced by means of light are exemplified by tracking grooves in the form of concentric circles, a spiral or stripes, having a groove width of from 0.1 μm to 5 μm, a pitch of from 1 μm to 12 μm and a depth of from 0.01 μm to 0.4 μm, or information pits with a size on the micron order. A slight elongation or shrinkage in size of such grooves or pits which may occur when they are transferred brings about defects in the optical recording medium. Stated specifically, when, for example, a tracking groove for an optical disk is transferred to a resin sheet, an elongation in size on its outer diameter produces an eccentricity in the optical disk to cause tracking errors, making it impossible to carry out recording and reproducing. Accordingly, in the case of a disk pattern, the deviation of the size on its outer diameter from a circle should preferably be not more than 90 μm, particularly not more than 50 μm, and more particularly not more than 30 μm.

Thus the roll stamper of the present invention is capable of accurately transferring such fine patterns on a resin sheet, and is particularly effective for the production of substrates for optical recording mediums such as optical disks and optical cards.

Figure 2:
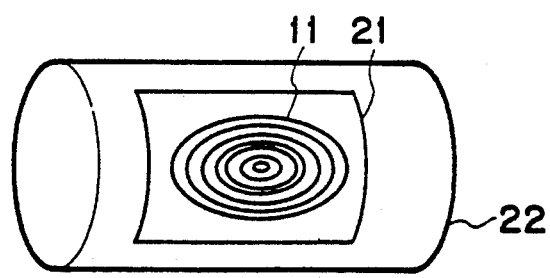
FIG. 2 diagramatically illustrates an embodiment of a roll stamper, in which the stamper shown in FIG. 1 is fixed on a mirror-finished roll.

As an example for the process for producing the roll stamper of the present invention, a photoresist layer is formed on a glass plate for a master and a pattern is drawn using a laser beam or electron beam, which is then developed to form a resist pattern. The resist pattern is subjected to Ni-electroforming, thereby to give a thin Ni stamper. Next, as shown in FIG. 2, this Ni stamper 21 is fixed to a mirror-finished roll substrate 22 by using an adhesive or a jig. A roll stamper can be thus obtained. Alternatively, a preformat pattern may be formed directly on the roll substrate or on a pattern forming layer provided on the substrate.

Here, the value of b/a of the preformat pattern on the stamper can be set to a given value in the following manner. For example, in the case of an optical disk, the pattern of tracking grooves is prepared in a circular form, and the stamper thus prepared is stretched by applying a tension thereto in the direction perpendicular to the direction in which a resin sheet is transported. The resulting stamper is fixed to the roll substrate. The roll stamper of the present invention can be thus obtained.

In the case of a roll stamper for molding a substrate sheet for optical disks, the roll stamper can be produced in the following manner: In the step of producing the the above Ni stamper, when a photoresist layer is formed on the glass plate for a master and a pattern is drawn on this resist layer by irradiation with a laser beam or the like, an optical head for carrying out irradiation with the laser beam while the glass plate for a master is rotated (hereinafter "cutting head") is vibrated in the radial direction of the glass plate for a master at a frequency twice the number of revolutions per second of the glass plate. An elliptical pattern can thereby be drawn and at the same time the difference between the major axis and the minor axis of this elliptical form can be made twice as long as the amplitude of vibration of the cutting head. Then, the Ni stamper obtained by Ni-electroforming using this glass plate may be fixed to the roll substrate in the manner that the direction of the minor axis of the elliptical pattern is in accordance with the direction in which a resin sheet is transported. Thus the roll stamper of the present invention for molding the substrate sheet for an information recording medium can be produced. In this instance, a stamper having an elliptical pattern can be obtained without applying any tension to the stamper, and hence it is possible to prevent the stamper from being broken.

Figure 5:
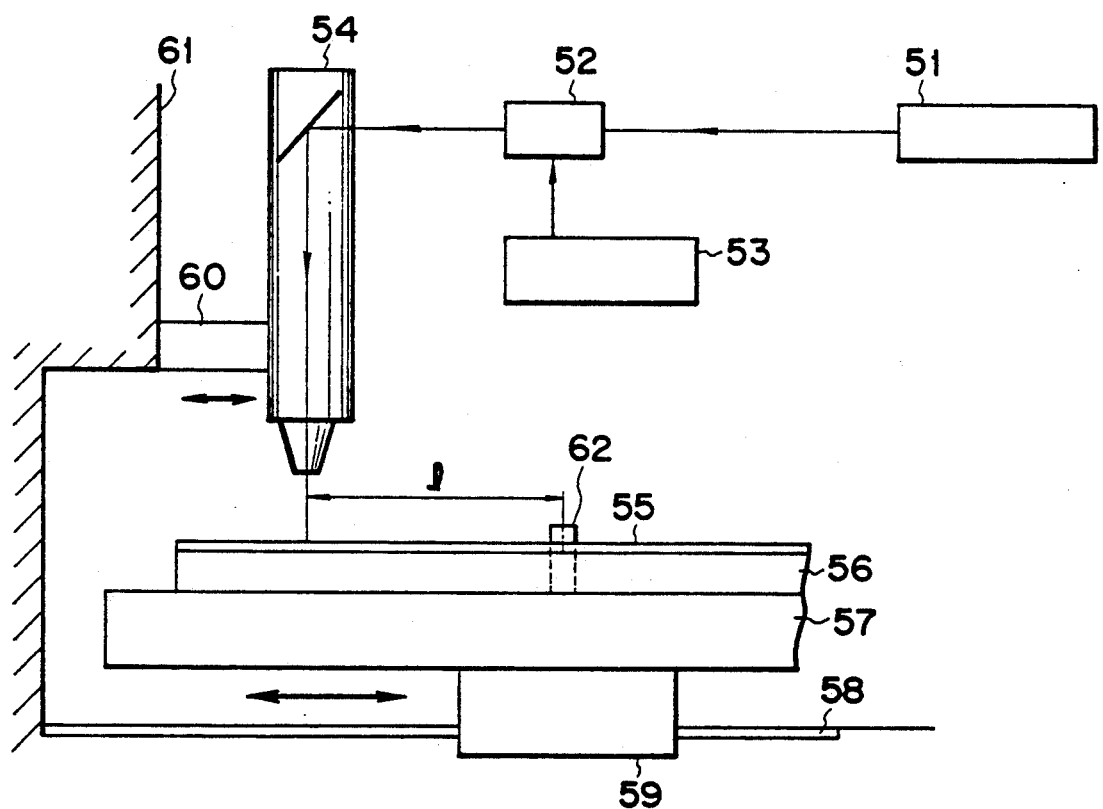
FIGS. 5 and 6 are each a schematic cross-sectional view of a cutting apparatus for a master used for the production of the roll stamper according to the present invention.

FIG. 5 illustrates an embodiment of a drawing apparatus for the master used in the production of this roll stamper.

In FIG. 5, the numeral 51 denotes a laser oscillator. A non-modulated laser beam is outputted from the laser oscillator 51. The numeral 53 denotes a modulated signal generator. A modulated signal corresponding to a pattern to be cut on a resist layer formed on an original plate 56, described later, for a master used for the stamper is outputted from the modulated signal generator 53. The numeral 52 denotes an optical modulator. In the optical modulator 52, the laser beam outputted from the above laser oscillator 51 is modulated corresponding to the modulated signal outputted from the above modulated signal generator 53, and the modulated laser beam is fed to a cutting head 54. Through the cutting head 54, the laser beam having been modulated through the optical modulator 53 is directed vertically downwards to converge on the surface of a resist layer on the original plate 56, made of glass, for a master used for the stamper (hereinafter "glass original plate 56") which is placed on a turn table 57. The cutting head is supported in the manner that it is slidable in the diameter direction of the glass original plate 56 by means of a horizontally sliding mechanism (not shown), and a piezoeletric device 60 is provided between the side of the above cutting head 54 and a machine frame 61. The piezoelectric device 60 expands or contracts according to an alternating voltage applied from a control means (not shown) and hence can reciprocate the above cutting head 54 in the diameter direction of the glass original plate 56.

The glass original plate 56 is provided on its surface with a resist layer 55. A pattern is cut on the resist layer 55 by means of the laser beam made to converge through the cutting head. Beneath the turn table 57, a motor 59 for direct drive is fitted, and its speed (i.e. the number of revolutions per minute) can be precisely controlled by the operation of the above control means and the turn table 57 can be rotated the turn table 57 around a spindle 62. The motor 59 is supported by a horizontally sliding mechanism 58 in the manner that it is slidable in the right-and-left direction shown in the drawing, and also is equipped with a feed mechanism (not shown) so that it can be slided to a given position by the operation of the above control means. The control means gives a command to the modulated signal generator 53 to cause a modulated signal to be outputted at a given speed. In accordance with the speed, it also controls the number of revolutions per minute of the motor 59, the frequency of vibration of the piezoelectric device 60 and the position of the cutting head 54 and changes the amplitude of vibration of the piezoelectric device 60 in accordance with the position of the cutting head 54.

The process for producing the roll stamper according to the present invention will be described below with reference to FIG. 5.

The motor 59 is rotated at a predetermined number of revolutions per minute under the control by the control means (not shown), and thus the turn table 57 and the glass original plate 56 are rotated by the rotation of the motor 59. In this state, the feed mechanism (not shown) is driven so that the motor 59, the turn table 57 and the glass original plate 56 are slid using the slide mechanism 58 to effect alignment. A laser beam and a modulated signal are then outputted from the laser oscillator 51 and the modulated signal generator 53, respectively, which are modulated in the optical modulator 52 and a modulated laser beam is outputted to the cutting head. Then the modulated laser beam is shot onto the resist layer 55 on the surface of the glass original plate 56 and thus the cutting head 54 cuts the resist layer to form a pattern corresponding to the modulated signal. At this time, the control means described above is operated to cause the piezoelectric device 60 to vibrate in the diameter direction of the glass original plate 56 synchronizing with the revolution of the motor 54, thereby causing the cutting head 54 to vibrate at a frequency twice the number of revolutions per second of the motor 59.

Here, the amplitude of vibration given to the cutting head 54 may be set in accordance with the value of b/a of the preformat pattern to be formed on the roll stamper.

This amplitude of vibration may also be controlled as a function of the distance l between the center of the glass original plate 56 (or the spindle 62 of the turn table 57) and a laser beam spot on the resist layer 55, in other words, the amplitude of variation may be made to vary for each track. This is preferred since the elliptical tracking groove or grooves having a constant ratio between the major axis and the minor axis can be formed over the whole track or tacks. As a proportional factor of the distance l, the factor may also be determined in accordance with the material for a disk substrate, the speed of molding, etc. so that the preformat pattern can be more round on a resin sheet. In particular, when this proportional factor is set to range from 0.001 to 0.04, particularly from 0.002 to 0.02, the tracking grooves for a die substrate can be accurately formed on a resin sheet.

Figure 6:
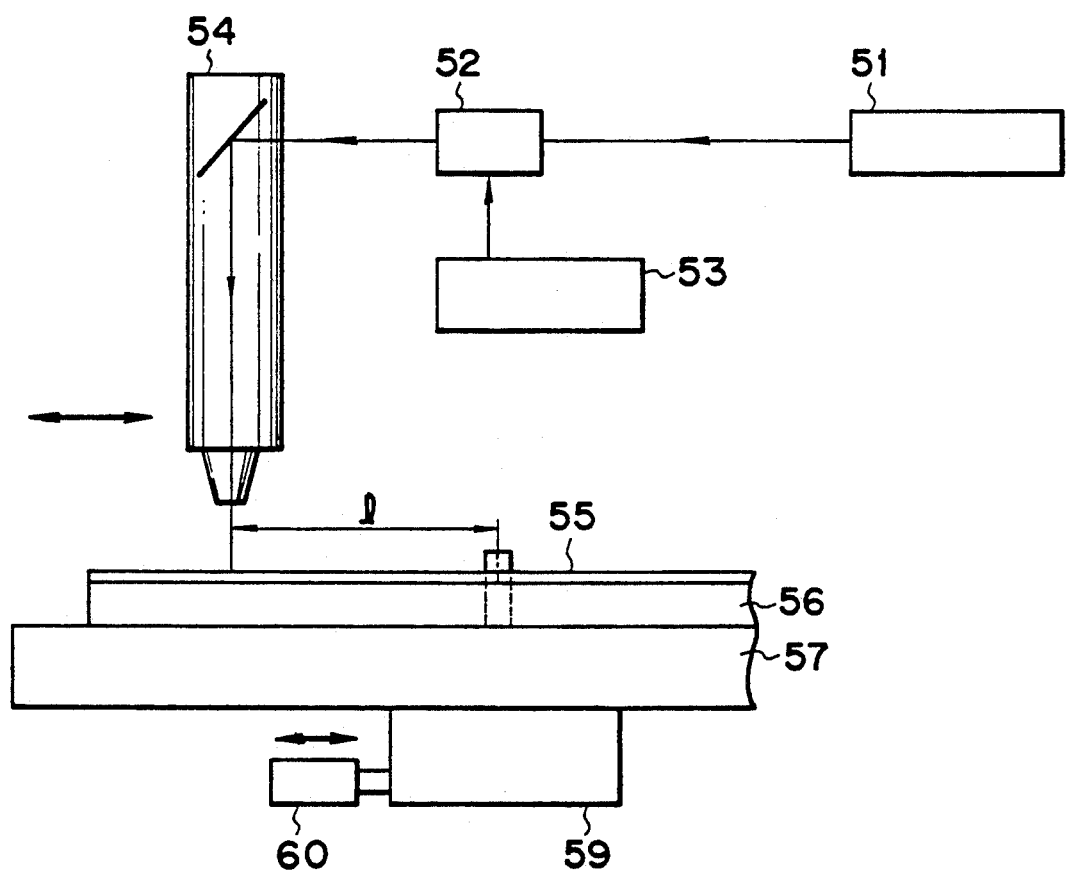

The cutting head may not be vibrated and instead the original master 56 may be vibrated as shown in FIG. 6.

After the cutting for one track is completed in this way, the motor 59, the turn table 57 and the glass original plate 56 are slid for one pitch (step feed) in the same way as in the above alignment, and then the pattern is cut on the resist layer formed on the glass original plate 56, in the same way as in the cutting described above. This operation is successively repeated to cut the resist layer on the glass original plate 56 to form thereon a preformat pattern for a disk. A resist pattern obtained by developing the resist layer is subjected to known steps such as post-baking, nickel sputtering, nickel electroforming, back polishing and external finishing. Thus a stamper having the preformat pattern 11 as shown in FIG. 1 can be obtained.

In FIG. 1, the letter symbol a represents the length of the minor axis of the outermost track; and b, the length of the major axis of the same track. The stamper having this preformat pattern is fixed to the roll substrate 22 in the manner that the direction of the minor axis of the above pattern may be in accordance with the direction in which a resin sheet is transported. Thus the roll stamper of the present invention for molding a substrate sheet for optical disks can be obtained.

In the above method of making the master, the amplitude of variation in the above vibration may be made substantially constant when the preformat pattern may not be in an excessively flat elliptical form and also it is unnecessary for the ratio of the major axis to the minor axis to be strictly equal over the whole track or tracks. In such an instance, it becomes unnecessary to provide the means for changing the amplitude of variation in proportion to the distance l between the cutting head 54 and the center of the glass original plate 56, so that the cost can be lowered.

In the present invention, metals, semiconductors, dielectrics or alloys may be used as materials for the roll substrate. For example, aluminum, glass, hard metal, mold steel (e.g. maraging steel) may be used, which are materials feasible for mirror-finishing. Particularly preferred is Cr steel, which can be mirror-finished with ease.

Figure 4:
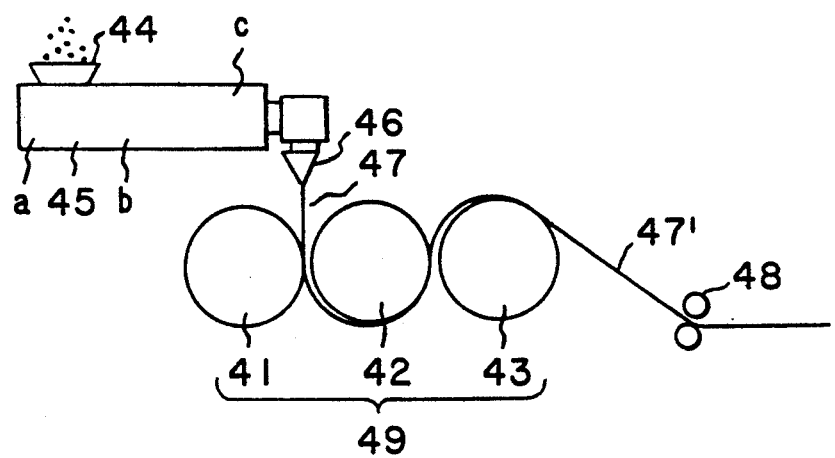
FIG. 4 diagramatically illustrates an embodiment of the process for producing a substrate sheet for information recording mediums, using the roll stamper according to the present invention.

The process for producing a substrate sheet for information recording mediums, using the roll stamper of the present invention, will be described below with reference to FIG. 4. FIG. 4 diagramatically illustrates an embodiment of the process for producing a substrate sheet for information recording mediums according to the present invention.

In FIG. 4, the numeral 45 denotes an extruder for carrying out extrusion; 46, a T-die; and 49, a pressure molding section, comprised of three rolls 41, 42 and 43.

At least one roll of these rolls serves as the roll stamper of the present invention. In the embodiment shown in FIG. 4, the roll 42 serves as the roll stamper, and the rolls 41 and 43 as mirror rolls.

First, resin pellets 44 put into the extruder 45 are heated and melted in the barrel of the extruder, pressed forward by a screw, and then formed into a sheet through the T-die. The temperature of the resin at this time may be in the range of from 260° C. to 330° C., and preferably from 280° to 320° C., in the case of, for example, a polycarbonate resin. From the T-die, the resin is continuously extruded in the form of a transparent molten resin sheet 47. The T-die is disposed in the manner that this molten resin sheet is extruded between the rolls 41 and 42 in the pressure molding section 49. The space between the tip of the T-die and the rolls 41 and 42 may preferably be set to be not more than 100 mm so that the resin can be prevented from being cured before it comes into contact with the rolls. The atmosphere that surrounds the T-die and the rolls may preferably be heated to a temperature of 60° C. or more.

Next, the resin sheet extruded between the rolls 41 and 42 is held between the heated roll 42 serving as the roll stamper and the roll 43 serving as a press roll, at which a preformat pattern is transferred to the resin sheet.

The roll stamper of the present invention is kept at such a temperature that the resin used may not be cured on the rolls.

More specifically, the roll stamper may preferably be heated to a temperature within the range of +20° C. to −20° C. of the temperature at which the resin used is thermally deformed. When, for example, a polycarbonate resin is used, the roll stamper may preferably be heated to have a surface temperature of from 120° C. to 160° C. Namely, when the temperature is controlled in the above range, the molten resin sheet is not rapidly cooled and hence no strain due to shrinkage or the like tends to be produced in the resin sheet. The temperature of the press roll 43 in the pressure molding section may preferably be set to be the same as or a little lower than that of the roll stamper 42.

The temperature of these rolls can be controlled, for example, by electrically heating them using a heater casted in the roll or by circulating a heating medium at the center of the roll.

Next, the resin sheet 47' on which preformat patterns have been formed is transported to take-off rolls 48. The take-off rolls 48 are rolls important to the continuous molding of the preformats, and are driven synchronously with the rolls in the pressure molding section 49.

In other words, these two sets of rolls have the same peripheral speed, and are preferably constructed in the manner that no stress due to a stretch or the like may act on the resin sheet between them. Taking such construction makes it possible to prevent an optical anisotropy from being produced at the interior of the resin sheet.

The thickness of the substrate sheet 47' for optical recording mediums depends on the gap or space between the rolls in the pressure molding section 49, the divergence between lips of the T-die, and the drawdown that is governed by the ratio of extrusion speed to stress rate, i.e., the degree of a stretch.

The sheet thickness is commonly controlled by making the divergence between lips of the T-die greater by 20 to 200% than the desired sheet pressure so that the drawdown is increased. In the present invention, however, the drawdown should be controlled to be from 50 to 150% in order to prevent the optical anisotropy or sheet thickness unevenness caused by a strain ascribable to drawdown.

Another manufacturing method of the present invention also provides a substrate sheet for information recording mediums having accurate preformats by heating and softening a resin sheet previously formed and then pressing the roll stamper of the present invention against it to transfer the preformat.

As described above, the roll stamper of the present invention and the process for producing a substrate sheet for information recording mediums by the use of the roll stamper make it possible to accurately transfer preformat patterns onto a resin sheet.

It has also become possible to continuously produce a resin sheet on which preformat patterns have been accurately transferred.

EXAMPLES

The present invention will be described below in greater detail by giving Examples.

EXAMPLE 1

Using the apparatus as shown in FIG. 5, cutting was carried out on a glass original plate having thereon a photoresist layer, at the part defined by the distance l of from 21 mm to 44.5 mm from the center of the glass original plate while the glass original plate was rotated at 900 rpm. At this time an alternating voltage of $900/60 \times 2 = 30$ Hz was applied to the piezoelectric device to cause the cutting head to vibrate in the diameter direction of the glass original plate. The amplitude of variation at this time was varied to be $(0.0039/2) \times 1$ (mm) in accordance with the distance l between the cutting head and the center of the glass original plate. The feed speed of the motor, the turn table and the glass original plate was set to be 24 μm/s.

After the cutting was carried out in this way, development was carried out to give a resist pattern in a spiral form with an elliptical shape of 89.000 mm in length (a) of the minor axis and 89.174 mm in length (b) of the major axis, corresponding to a tracking groove having, at a convex part, a width of 0.6 μm, a pitch of 1.6 μm and a height of 1,000 Å. Next, this resist pattern was subjected to Ni electroforming to prepare a stamper. The resulting stamper was adhered with an adhesive (trade name: SC-55; available from Sony Chemicals K. K.) to a roll substrate in the manner that the direction of the minor axis of the stamper was in accordance with the direction in which a resin sheet is transported. A roll stamper was thus produced.

Using this roll stamper, the apparatus for producing a substrate sheet for optical recording mediums, as shown in FIG. 4, was set up. In the manner as shown in FIG. 4, the substrate sheet for optical recording mediums was prepared using an extruder having an screw of 35 mm in diameter and a coat hanger type T-die of 20 cm in width, downwards provided to the body of the extruder.

A polycarbonate resin (trade name: Panlite L-1250; available from Teijin Chemicals Ltd.) was used as the resin. The pressure molding section 49 was comprised of the rolls 41 and 43 serving as mirror rolls, and the roll 42 serving as the roll stamper previously prepared.

The resin sheet was extruded under conditions of extruder barrel temperatures of 300° C. at the part a (Ta), 300° C. at the part b (Tb) and 320° C. at the part c (Tc) of the extruder 45 and a T-die temperature Td of 320° C., under which a molten resin sheet was formed. At this time the resin temperature was in the range of 280° C. to 330° C.

The roll stamper 42 was kept at a temperature of 140° C. The roll 41 was kept at a temperature lower than that of the roll 42 by 1° to 2° C., and the roll 43 was kept at a temperature higher than that of the roll 32 by 20° to 21° C.

The space between the lips of the T-die and the pressure molding section was set to be 50 mm, and its surrounding was surrounded with a heating box to make control so that the atmosphere from the extrusion of the resin to the pressure molding section was kept at 60° C. or higher. The divergence between the lips of the T-die was set to 0.48 mm and the gap between the rolls 41 and 42 in the pressure molding section was set to 1.2 mm, under the conditions of which the preformat pattern of the roll stamper 42 was transferred to the resin sheet to carry out the production of a substrate sheet for optical recording mediums with a thickness of 1.2 mm.

Figure 3:
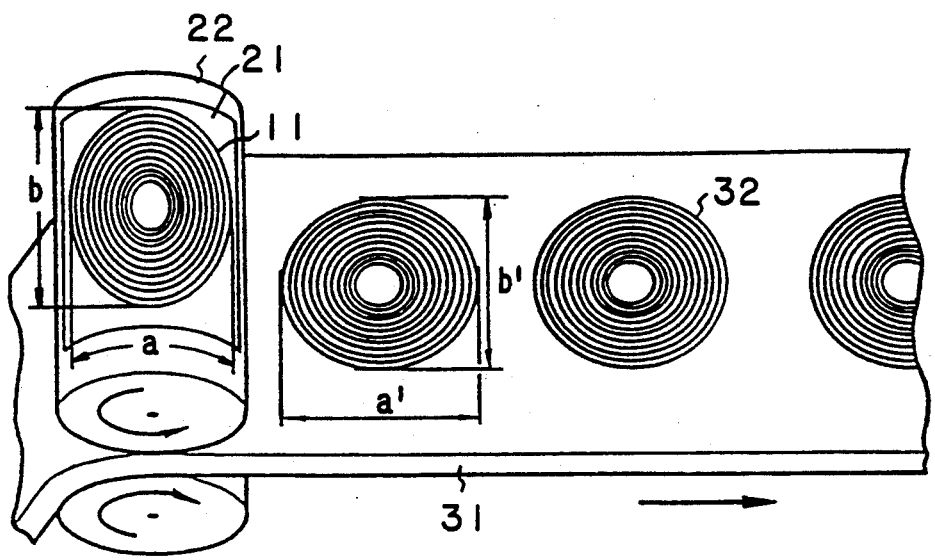
FIG. 3 schematically illustrates the process of transferring preformat patterns on a resin sheet, using the roll stamper according to the present invention.

The resin sheet was molded at a speed of 2 m/min. With respect to the preformat patterns thus formed on the substrate sheet for information recording mediums, the length of the preformat pattern in the direction parallel to the direction in which the resin sheet was transported was represented by a' and the length in the direction perpendicular thereto by b' as shown in FIG. 3. The lengths a' and b' were measured and the deviation of b' when viewed on the basis of a' was regarded as the amount of deviation from a circle. This measurement was made on three samples selected at random. Results obtained are shown in Table 1.

TABLE 1

| Sample No. | a' (mm) | b' (mm) | Amount of deviation from circle (μm) | Amount of amplitude of tracking error signals |
|---|---|---|---|---|
| 1 | 88.689 | 88.684 | 5 | AA |
| 2 | 88.687 | 88.683 | 4 | AA |
| 3 | 88.689 | 88.685 | 4 | AA |

Subsequently, substrates were cut out from the substrate sheet for optical recording mediums on which the above measurement was made. Thereafter, aluminum was deposited in a thickness of 1,000 Å to produce optical disks.

The resulting optical disks were evaluated using an optical disk evaluation apparatus (trade name: OMS-1000 Type III; manufactured by Nakamichi K. K.) by measuring the amplitude of tracking error signals. The case in which the amount of amplitude at this time was less than 0.2V was evaluated as "AA", the case of from 0.2V to less than 0.4V as "A", the case of from 0.4V to less than 1.0V as "B", and the case of 1.0V or more up to tracking-off as "C".

EXAMPLE 2

Using the same apparatus as used in Example 1, cutting was carried out on a glass original plate having thereon a photoresist layer, at the part defined by the distance l of from 20 mm to 44.5 mm from the center of the glass original plate while the glass original plate was rotated at 1,200 rpm. At this time an alternating voltage of 1,200/60×2=40 Hz was applied to the piezoelectric device to cause the cutting head to vibrate in the diameter direction of the glass original plate while the amplitude of variation was varied to be (0.0118/2)×1 (mm) in accordance with the distance l between the cutting head and the center of the glass original plate.

In this way, a resist pattern was obtained in a spiral form with an elliptical shape of 89.000 mm in length (a) of the minor axis and 89.525 mm in length (b) of the major axis, corresponding to a tracking groove for an optical disk. Next, this resist pattern was subjected to Ni electroforming to prepare a stamper. The resulting stamper was adhered with an adhesive to a roll substrate in the manner that the direction of the minor axis of the stamper was in accordance with the direction in which a resin sheet is transported. A roll stamper was thus produced. Subsequently, using this roll stamper, the substrate sheet for optical disks was prepared in the same manner as in Example 1 by continuously transferring optical disk preformat patterns onto the resin sheet formed by extrusion.

With respect to the preformat patterns thus obtained on the substrate sheet for information recording mediums, the amount of deviation from a circle was measured in the same manner as in Example 1. Substrates for optical disks were also cut out from this substrate sheet to produce optical disks, and the amplitude of tracking error signals was measured. Results obtained are shown in Table 2.

TABLE 2

| Sample No. | a' (mm) | b' (mm) | Amount of deviation from circle (μm) | Amount of amplitude of tracking error signals |
|---|---|---|---|---|
| 1 | 88.733 | 88.764 | 31 | AA |
| 2 | 88.732 | 88.761 | 29 | AA |
| 3 | 88.729 | 88.761 | 32 | AA |

EXAMPLE 3

In the same manner as in Example 1, the roll stamper of the present invention was prepared and preformat pattern for optical disks were transferred to the resin sheet formed by extrusion. In the present Example, the preformat pattern on the roll stamper was in an elliptical shape of 89.423 mm in length (a) in the direction parallel to the direction in which the resin sheet is transported and 89.793 in length (b) in the direction perpendicular to the direction in which the resin sheet is transported, and so formed as to correspond to tracking grooves having, at a convex part, a width at the land, of 0.6 μm, a pitch of 1.6 μm and a height of 1,000 Å.

With respect to the preformat patterns thus obtained on the substrate sheet for information recording mediums, measurement was made the same manner as in Example 1. On optical disks prepared from the substrate sheet, the amplitude of tracking error signals was also measured. Results obtained are shown in Table 3.

TABLE 3

| Sample No. | a' (mm) | b' (mm) | Amount of deviation from circle (μm) | Amount of amplitude of tracking error signals |
|---|---|---|---|---|
| 1 | 88.996 | 88.992 | 4 | AA |
| 2 | 88.995 | 89.001 | 6 | AA |
| 3 | 89.000 | 88.995 | 5 | AA |

EXAMPLE 4

A substrate sheet for optical disks was continuously formed in the same manner as in Example 1 except that the preformat pattern formed on the roll stamper was made to be 89.023 in length (a) and 89.793 in length (b).

With respect to the thus formed preformats of the substrate sheet for optical disks, thus formed, measurement and evaluation were made in the same manner as in Example 1. Results obtained are shown in Table 4.

TABLE 4

| Sample No. | a' (mm) | b' (mm) | Amount of deviation from circle (μm) | Amount of amplitude of tracking error signals |
|---|---|---|---|---|
| 1 | 89.029 | 89.003 | 26 | A |
| 2 | 89.021 | 88.989 | 32 | A |
| 3 | 89.032 | 89.011 | 21 | AA |

EXAMPLES 5 to 8

Substrate sheets for optical disks were continuously formed in the same manner as in Example 1 except that the preformat patterns formed on the roll stampers were made to have the lengths a and b as shown in the following Table 5. With respect to the preformats formed on the substrate sheet for optical disks, measurement and evaluation were made in the same manner as in Example 1.

REFERENCE EXAMPLES 1 and 2

Substrates for optical disks were prepared in the same manner as in Example 1 except that the preformat patterns formed on the roll stampers were made to have the lengths a and b as shown in Table 5. With respect to the preformats formed on the substrate sheet for optical disks, measurement of size and evaluation were made.

Results of Examples 5 to 8 and Reference Example 1 and 2 are shown in Table 5.

TABLE 5

| | Preformat pattern on stamper | | Sample No. | Preformat on resin sheet | | Amount of deviation from circle (μm) | Amount of ampltitude of tracking error signals |
|---|---|---|---|---|---|---|---|
| | a (mm) | b (mm) | | a' (mm) | b' (mm) | | |
| Example: | | | | | | | |
| 5 | 89.752 | 89.797 | 1 | 89.046 | 89.005 | 41 | A |
| (b-a/a) × 100 = | | | 2 | 89.056 | 89.011 | 45 | A |
| 0.05 | | | 3 | 89.051 | 89.008 | 43 | A |
| 6 | 89.685 | 89.775 | 1 | 89.001 | 89.004 | 3 | AA |
| (0.1) | | | 2 | 88.999 | 89.003 | 4 | AA |
| | | | 3 | 89.001 | 89.003 | 2 | AA |
| 7 | 88.981 | 89.880 | 1 | 88.980 | 89.002 | 22 | AA |
| (1) | | | 2 | 88.979 | 88.999 | 20 | AA |
| | | | 3 | 88.983 | 89.004 | 21 | AA |
| 8 | 88.192 | 89.956 | 1 | 88.989 | 89.085 | 96 | B |
| (2) | | | 2 | 88.988 | 89.086 | 98 | B |
| | | | 3 | 88.992 | 89.081 | 89 | A |
| Reference Example: | | | | | | | |
| 1 | 89.783 | 89.792 | 1 | 89.174 | 88.994 | 180 | C |
| (0.01) | | | 2 | 89.179 | 89.003 | 176 | C |
| | | | 3 | 89.172 | 88.989 | 183 | C |
| 2 | 87.518 | 90.225 | 1 | 88.906 | 89.094 | 188 | C |
| (3) | | | 2 | 88.902 | 89.090 | 188 | C |
| | | | 3 | 88.903 | 89.094 | 191 | C |

EXAMPLE 9

Using the apparatus as shown in FIG. 6, cutting was carried out on a glass original plate having thereon a photoresist layer, at the part defined by the distance l of from 20 mm to 44.5 mm from the center of the glass original plate while the glass original plate was rotated at 900 rpm. At this time an alternating voltage of 900/60×2=30 Hz was applied to the piezoelectric device to cause the motor, the turn table and the glass original plate to vibrate in the right-and-left direction. The amplitude of variation at this time was varied to be (0.0042/2)×l (mm) in accordance with the distance l between the cutting head and the center of the glass original plate.

After the cutting was carried out in this way, development was carried out to give a resist pattern in a spiral form with an elliptical shape of 89.000 mm in length (a) of the minor axis and 89.187 mm in length (b) of the major axis, corresponding to a tracking groove having, at a convex part, a width of 0.6 μm, a pitch of 1.6 μm and a height of 1,000 Å. Next, this resist pattern was subjected to Ni electroforming to prepare a stamper. The resulting stamper was adhered with an adhesive (trade name: SC-55; available from Sony Chemicals K. K.) to a roll substrate in the manner that the direction of the minor axis of the stamper was in accordance with the direction in which a resin sheet is transported. A roll stamper was thus produced.

Using this roll stamper, a plurality of preformats for optical disks were transferred onto a polycarbonate resin sheet formed by extrusion, in the same manner as in Example 1. A substrate sheet for optical disks was thus produced. With respect to the preformat patterns on this substrate sheet, measurement and evaluation were made in the same manner as in Example 1.

EXAMPLE 10

Using the same apparatus as used in Example 9, cutting was carried out on a glass original plate having thereon a photoresist layer, at the part defined by the distance l of from 20 mm to 44.5 mm from the center of the glass original plate while the glass original plate was rotated at 600 rpm. At this time an alternating voltage of $600/60 \times 2 = 20$ Hz was applied to the piezoelectric device to cause the motor, the turn table and the glass original plate to vibrate in the diameter direction of the glass original plate while the amplitude of variation was varied to be $(0.014/2) \times l$ (mm) in accordance with the distance l between the cutting head and the center of the glass original plate.

After the cutting was carried out in this way, development was carried out to give a resist pattern in a spiral form with an elliptical shape of 89.000 mm in length (a) of the minor axis and 89.623 mm in length (b) of the major axis, corresponding to a tracking groove having, at a convex part, a width at the land, of 0.6 μm, a pitch of 1.6 μm and a height of 1,000 Å. Next, this resist pattern was subjected to Ni electroforming to prepare a stamper. The resulting stamper was adhered with an adhesive (trade name: SC-55; available from Sony Chemicals K. K.) to a roll substrate in the manner that the direction of the minor axis of the stamper was in accordance with the direction in which a resin sheet is transported. A roll stamper was thus produced.

Using this roll stamper, a plurality of preformats for optical disks were transferred onto a polycarbonate resin sheet formed by extrusion, in the same manner as in Example 1. A substrate sheet for optical disks was thus produced. With respect to the preformats on this substrate sheet, measurement and evaluation were made in the same manner as in Example 1.

Results of the above Examples 7 and 8 are shown in Table 6.

TABLE 6

| Example: | Preformat pattern on stamper | | Sample No. | Preformat on resin sheet | | Amount of deviation from circle (μm) | Amount of amplitude of tracking error signals |
| --- | --- | --- | --- | --- | --- | --- | --- |
| | a (mm) | b (mm) | | a' (mm) | b' (mm) | | |
| 7 | 89.000 | 89.187 | 1 | 88.563 | 88.590 | 27 | AA |
| (b-a/a) × 100 = | | | 2 | 88.559 | 88.589 | 30 | AA |
| 0.21 | | | 3 | 88.611 | 88.641 | 30 | AA |
| 8 | 89.000 | 89.623 | 1 | 88.849 | 88.861 | 12 | AA |
| (0.7) | | | 2 | 88.842 | 88.857 | 15 | AA |
| | | | 3 | 88.854 | 88.865 | 11 | AA |

We claim:

1. A process for producing a roll stamper for moding a substrate sheet for information recording mediums by continuously transferring preformat patterns on a resin sheet, comprising the steps of:

rotating an original plate having thereon a photoresist layer at a predetermined number of revolutions per minute;

providing a cutting head for cutting a pattern on the photoresist layer corresponding to the preformat pattern;

vibrating the original plate in a radial direction at a frequency twice the given number of revolutions per second of the original plate;

cutting the pattern on the photoresist layer;

developing the cut pattern to form a resist pattern in which each track is elliptical and which has an elliptical shape having a value b/a of greater than 1, with a being the length of the minor axis and b being the length of the major axis at the outermost track;

electroforming the resist pattern to form a stamper having the preformat pattern; and fixing the stamper to a roll substrate such that the minor axis direction of the pattern is in the direction in which the resin sheet is transported.

2. A process for producing a roll stamper according to claim 1, wherein the original plate is vibrated at an amplitude of variation varied in proportion to the distance between the portion of the photoresist layer which is being cut and the center of the original plate.

3. A process for producing a roll stamper according to claim 1, wherein the amplitude of vibration of the original plate is from 0.001 l to 0.04 l, where "l" is a distance between the center of the original plate and a laser beam spot on the original pate.

4. A process for producing a roll stamper for molding a substrate sheet for information recording mediums by continuously transferring preformat patterns on a resin sheet, comprising the steps of:

rotating an original plate having thereon a photoresist layer at a predetermined number of revolutions per minute;

providing a cutting head for cutting a pattern on the photoresist layer corresponding to the preformat pattern;

vibrating the cutting head in a radial direction of the original plate at a frequency twice the given number of revolutions per second of the original plate;

developing the cut pattern to form a resist pattern in which each track is elliptical and which has an elliptical shape having a value b/a of greater than 1, with a being the length of the minor axis and b being the length of the major axis at the outermost track;

electroforming the resist pattern to form a stamp for having a preformat pattern; and fixing the stamper to a roll substrate such that the minor axis direction of the pattern is in the direction in which the resin sheet is transported.

5. A process for producing a roll stamper according to claim 4, wherein the cutting head is vibrated at an amplitude of variation varied in proportion to the distance between the portion of the photoresist layer which is being cut and the center of the original plate.

6. A process for producing a roll stamper according to claim 4, wherein the amplitude of the vibration of the cutting head is from 0.001 l to 0.04 l, where "l" is a distance between the center of the original plate and a laser beam spot on the original plate.

* * * * *

UNITED STATES PATENT AND TRADEMARK OFFICE
CERTIFICATE OF CORRECTION

PATENT NO. : 5,266,136
DATED : November 30, 1993
INVENTOR(S) : Kanome et al.

It is certified that error appears in the above-indentified patent and that said Letters Patent is hereby corrected as shown below:

COLUMN 9:

Line 23, "roll 32" should read --roll 42--.

COLUMN 13:

Line 53, "moding" should read --molding--.

COLUMN 14:

Line 19, "pate" should read --plate--.

Signed and Sealed this

Eighth Day of November, 1994

Attest:

BRUCE LEHMAN

*Attesting Officer*     *Commissioner of Patents and Trademarks*